United States Patent
Morfino

(10) Patent No.: US 6,681,144 B1
(45) Date of Patent: Jan. 20, 2004

(54) PROCESS AND SYSTEM FOR WORKING A WORKPIECE THROUGH NUMERICALLY CONTROLLED MACHINE TOOLS

(75) Inventor: Giuseppe Morfino, Pino Torinese (IT)

(73) Assignee: Fidia S.p.A., San Mauro Torinese (IT)

( * ) Notice: Subject to any disclaimer, the term of this patent is extended or adjusted under 35 U.S.C. 154(b) by 0 days.

(21) Appl. No.: 09/806,028

(22) PCT Filed: Sep. 1, 1999

(86) PCT No.: PCT/IT99/00277

§ 371 (c)(1), (2), (4) Date: Mar. 26, 2001

(87) PCT Pub. No.: WO00/19285

PCT Pub. Date: Apr. 6, 2000

(30) Foreign Application Priority Data

Sep. 25, 1998 (IT) .......................................... TO98A0812

(51) Int. Cl.[7] .............................................. G06F 19/00
(52) U.S. Cl. ........................................ 700/182; 700/188
(58) Field of Search ................................ 700/182, 188, 700/180, 173

(56) References Cited

U.S. PATENT DOCUMENTS

| | | | | |
|---|---|---|---|---|
| 5,121,333 A | | 6/1992 | Riley et al. ............ | 364/474.05 |
| 5,148,372 A | * | 9/1992 | Maiocco et al. ............ | 700/182 |
| 5,396,160 A | * | 3/1995 | Chen ........................... | 318/573 |
| 5,406,494 A | * | 4/1995 | Schuett ....................... | 700/188 |
| 5,552,992 A | * | 9/1996 | Hunter ....................... | 700/118 |

FOREIGN PATENT DOCUMENTS

| | | | |
|---|---|---|---|
| DE | 4341367 C1 | 6/1995 | |
| EP | 0 284 674 | 10/1988 | |
| WO | WO93/09482 | 5/1993 | |
| WO | WO 93/09482 | * 5/1993 | ......... G05B/19/405 |
| WO | WO98/30176 | 7/1998 | |

* cited by examiner

Primary Examiner—Albert W. Paladini
Assistant Examiner—Alexander Kosowski
(74) Attorney, Agent, or Firm—Finnegan, Henderson, Farabow, Garrett & Dunner, LLP

(57) ABSTRACT

The present invention provides a method and system for working a workpiece with a numerically controlled machine tool having a working tool. An electronic representation of an object to be worked is read and stored. Then, the working tool is moved in real-time based on the electronic representation that is read. To move the working tool, a user provides at least one movement parameter for the working tool, where the parameter includes at least one of direction parameters, space limits, and tool movement topologies. Moreover, moving the working tool is based on the at least one parameter provided by the user, and an initial movement of the working tool occurs when the electronic representation of the object is stored and the at least one parameter for working the object is provided.

12 Claims, 1 Drawing Sheet

Figure 1:
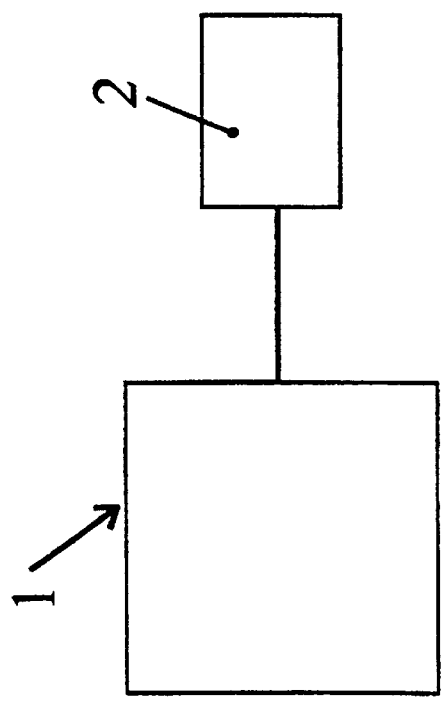

PROCESS AND SYSTEM FOR WORKING A WORKPIECE THROUGH NUMERICALLY CONTROLLED MACHINE TOOLS

The present invention refers in general to a process and a system for working a workpiece through numerically controlled machine tools, and in particular to a process and a system for working a workpiece through computer-aided copying techniques.

So far, when it is necessary to realize a copy of a workpiece through machine tools, three different types of techniques have been known and have been applied in the field, obviously starting from the project design of the piece to be copied, and apart from the common realization of drawings on paper, from which production dies are obtained, etc.

These three techniques are:
a) realizing drawings of the "electronic" type, that is through Computer Aided Design (CAD) techniques, these drawings being used for generating, through Computer Aided Manufacturing (CAM) techniques, a number of tool paths that the numeric control of the machine tool executes in a known way;
b) realizing a physical model of the workpiece to be copied, to such model a scanning ("digitizing") technique being applied, such technique allowing to automatically create paths for the numeric control of the machine tool similarly to the above technique a); and
c) realizing a physical model of the workpiece to be copied, to which model the so-called direct copying technique is applied. Based on this technique, the outline of the "model" workpiece is followed by a feeler pin, directly connected to the copying machine tools that works on the rough workpiece. The electronic control of the machine copier is such as to have algorithms that keep the feeler pin in contact with the model and make the tool move on the same path realized by the feeler pin.

The above procedures (b) and (c) are complicated and costly, since they provide the presence of a model to be copied and of a machine tool provided with a feeler pin; moreover, they are subjected to inaccuracies, since possible model faults are taken to the final copied workpiece. Procedure (a), instead, is not subjected to faults, but has complicated aspects and high costs that are necessary to apply the CAM techniques.

Object of the present invention is solving the above prior-art problems, by providing a process and a system that allow perfectly reproducing workpieces to be worked in an automated way, instant by instant, and simultaneously provide the workshop operator with the possibility of choosing movement directions of working tools according to the best available alternatives, keeping the perfect correspondence between "virtual" workpiece to be realized and "real" finished workpiece. Through the process and system of the present invention, it is possible to do without the presence of a model workpiece and of the feeler pin, and to do without all possible sources of errors and inaccuracies, since the model of the workpiece to be copied is stored in the control memory and is not subjected to variations. Moreover, it is possible in this way to do without any technique of the CAM type, with its related costs, thereby obtaining a result that is at least equivalent, but often also superior, as regards yield and accuracy, with respect to CAM techniques themselves.

The above and other objects and advantages of the invention, as will appear from the following description, are obtained by a process and a system as claimed in claims 1 or 2, and 8 or 9, respectively. Preferred embodiments and non-trivial variations of the present invention are claimed in the dependent claims.

Figure 2:
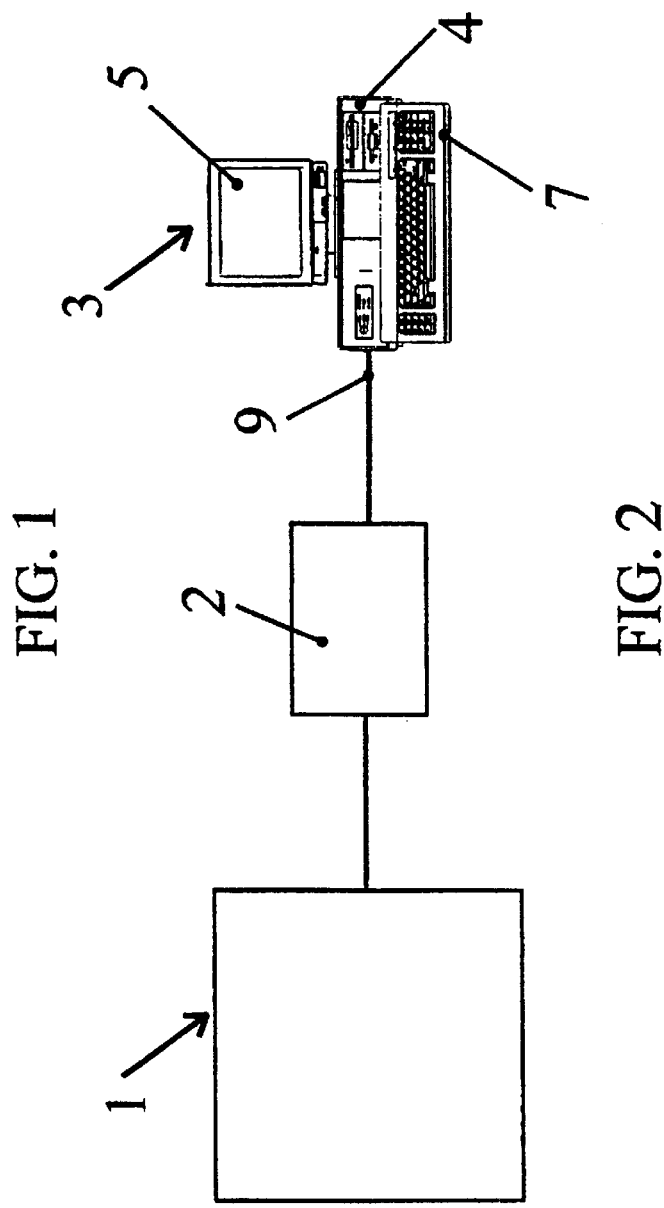

The present invention will be better described by some preferred embodiments thereof, given as a non-limiting example, with reference to the enclosed drawings, in which:

FIG. 1 is a schematic block diagram of a first preferred embodiment of a configuration that allows putting the present invention into practice; and FIG. 2 is a schematic block diagram of a second preferred embodiment of a configuration that allows putting the present invention into practice.

With reference to FIG. 1, a first and more common embodiment of a configuration for putting the invention into practice comprises, as is known in the art, a machine tool 1, for example a milling machine, to which a control unit 2 is connected, that can also be a common computerized numerically controlled unit. The system for realizing the process of the present invention is placed in the control unit 2, that, together with the machine tool 1, thereby composes a copying machine tool real and proper; or, the above system can be inserted, as said, into an existing computerized numerically controlled unit 2 (that can be composed also by a Central Processing Unit (CPU) with display and keyboard), that therefore performs, among the others, both functions of working and copying for the connected machine tool 1.

With reference to FIG. 2, instead, a second preferred embodiment is shown of the configuration that puts the present invention into practice, in which there are always the numerically controlled machine tool 1 and the control unit 2, with the addition of a work-station 3, that can be commonly composed of a Central Processing Unit (CPU) 4, a display 5 and a keyboard 7. The work-station 3 is connected through lines 9 or equivalent means to the control unit 2.

The control unit 2 and/or the CPU 4 contain therein the software adapted to realize the process of the present invention, through adequate means that can be composed of modules written in any programming language suitable for such purpose.

In the following description, the term "electronic representation" means the mathematical/numerical model of an object realized through known CAD techniques, and these terms are therefore to be considered as equivalent.

According to the present invention, the system that allows realizing the process of the present invention for working a workpiece through computer-aided numerically controlled machine tools, first comprises means for reading an electronic representation of an object to be worked. These means produce a representation that is commonly in the form of data files having one of the formats for describing mathematical surfaces, such as IGES (Initial Graphics Exchange Specification) or VDA-FS (Verband der Automobilindustrie Flaechen Schnittstelle).

The system further comprises means for providing a plurality of movement parameters of a tool for working the object; these parameters are provided by the user and include, together or as an alternative, movement directions, movement space limits and tool movement typologies.

Finally, the system of the present invention comprises means for real-time moving the working tool by means of the numerically controlled machine tool based on the stored electronic representation for the object to be worked and on the parameters chosen by the operator.

According to an alternative embodiment, the system of the invention can also comprise means for computing the internal mathematical model of the object based on data obtained from the means for reading the representation itself, when such operation becomes necessary. The means for computing the internal mathematical model comprise algorithms of a general and known type, suitable to provide an approximation of mathematical surfaces with adequate representations.

As regards the means for real-time moving, they operate through commands inserted by the end user and automatically executed by the machine tool based on the electronic representation of the object stored therein and on the parameters previously provided by the operator. The means for inputting and moving the axes, more widely adopted by the end user, are a common push-button panel (not shown) installed aboard the machine, and/or the keyboard and the display of the control unit 2 and/or of the work-station 3. In this way, the end user (that in particular is the workshop operator responsible for workings on numerically controlled machine tools) is enabled to choose the direction and the type of working that are most appropriate for the particular current working conditions. In fact, the operator is left with the most complete freedom of choice about when and how moving the machine to realize the workpiece: the means for moving do not operate at all if the end user does not insert any command therefor.

A major feature of the present invention is that the means for moving operate through the real-time computation of movement coordinates of the tool based on the mathematical model of the object stored in the control unit 2 of the machine tool.

The program for realizing the working tool movement is commonly implemented by applying known algorithms for checking the collision between workpiece and tool.

According to the inventive process, the commands input by the end user, through a push-button panel and/or a keyboard, point out a tool movement direction and are applied following the mathematical model and the stored parameters. Based on the workpiece representation defined in memory, the system is therefore able to comply with the parameters defined by the user following the optimum path stored and realizing it in real time through the machine tool.

Moreover, in the inventive process, the movement allows complying (without added inaccuracies in addition, obviously, to those intrinsic for the machine) with the workpiece surface whose description is known by the system.

Due to this simple and straightforward configuration, the system of the present invention allows doing without tool paths that previously had to be computed through CAM techniques, and also without the physical model of the workpiece to be copied.

The mathematical model realized through CAD techniques or computed for such purpose is stored in the system and used as "imaginary surface" on which the tool moves and behaves as copier simultaneously following the commands input by the operator.

What is claimed is:

1. A method for working a workpiece with a numerically controlled machine tool having a working tool comprising the steps of:

reading an electronic representation of an object to be worked;

storing the electronic representation;

computing an internal mathematical model of the object based on data obtained from the electronic representation being read, the internal mathematical model being used as a reference imaginary surface for the working tool;

storing the internal mathematical model;

providing, through a user, at least one parameter for a working tool for working the object, the at least one parameter including, at least one of direction parameters, space limits, and tool movement typologies;

moving in real-time the working tool of the numerically controlled machine tool based on a real-time computation of movement coordinates of the working tool based on the electronic representation of the object, on the internal mathematical model of the object, and on the at least one parameter being provided, wherein an initial movement of the working tool occurs when the electronic representation and the internal mathematical model are stored and the at least one parameter for working the object is provided.

2. The method of claim 1, wherein moving the working tool in real-time occurs when the machine tool executes a command as a result of a user providing an instruction based on the stored electronic representation of the object.

3. The method of claim 2, wherein the working tool is not moved if the user fails to provide an instruction.

4. The method of claim 1, wherein the working tool allows conforming to a workpiece surface having a known representation.

5. The method of claim 2, wherein the user is a workshop operator responsible for a plurality of workings on the numerically controlled machine tool.

6. A system for working a workpiece with a numerically controlled machine tool having a working tool, comprising:

means for reading an electronic representation of an object to be worked and storing the electronic representation;

means for computing an internal mathematical model of the object based on data obtained from the electronic representation being read, the internal mathematical model being used as a reference imaginary surface for the working tool;

means for storing the internal mathematical model;

means for moving in real-time the working tool based on the electronic representation that is read;

wherein said means for moving the working tool comprises:

means for providing, through a user, at least one movement parameter for the working tool for working the object, said at least one movement parameter including, at least one of direction parameters, space limits, and tool movement typologies;

wherein said means for moving the working tool operates based on a real-time computation of movement coordinates of the working tool based on the electronic representation of the object, on the internal mathematical model of the object, and on the at least one parameter being provided, wherein an initial movement of the working tool occurs when the electronic representation and the internal mathematical model are stored and the at least one parameter for working the object is provided.

7. The system of claim 6 wherein said means for moving the working tool operates through at least one command input by a user and automatically executed by the numerically controlled machine tool based on the stored electronic representation.

8. The system of claim 7, wherein the means for moving the working tool does not operate if the user fails to input a command.

9. The system of claim 7, wherein a command may be inputted through a push-button panel associated with the numerically controlled machine tool.

10. The method of claim 7, wherein a command may be inputted through a keyboard and a display of a control unit for a machine containing the numerically machine tool or on a work-station.

11. The system of claim 6, wherein said means for moving the working tool allows conforming to a workpiece surface having a known representation.

12. The system of claim 7, wherein said user is a workshop operator responsible for the numerically controlled machine tool.

* * * * *